(12) United States Patent
Wakamatsu et al.

(10) Patent No.: US 7,605,108 B2
(45) Date of Patent: Oct. 20, 2009

(54) CATALYST, EXHAUST GAS PURIFICATION CATALYST, AND METHOD FOR MANUFACTURING SAME

(75) Inventors: Hironori Wakamatsu, Yokohama (JP); Hirofumi Yasuda, Yokosuka (JP); Kazuyuki Shiratori, Yokohama (JP); Masanori Nakamura, Yokosuka (JP); Katsuo Suga, Yokohama (JP); Toru Sekiba, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 211 days.

(21) Appl. No.: 11/578,295

(22) PCT Filed: Jul. 5, 2005

(86) PCT No.: PCT/IB2005/001906
§ 371 (c)(1),
(2), (4) Date: Oct. 13, 2006

(87) PCT Pub. No.: WO2006/006046
PCT Pub. Date: Jan. 19, 2006

(65) Prior Publication Data
US 2007/0244001 A1    Oct. 18, 2007

(30) Foreign Application Priority Data
Jul. 8, 2004    (JP) ............................. 2004-202125
Dec. 27, 2004    (JP) ............................. 2004-377929

(51) Int. Cl.
*B01J 23/00*    (2006.01)
*B01J 21/00*    (2006.01)
*B01J 20/00*    (2006.01)

(52) U.S. Cl. ........................ 502/326; 502/302; 502/303; 502/304; 502/327; 502/329; 502/331; 502/332; 502/333; 502/334; 502/339; 502/340; 502/341; 502/345; 502/346; 502/349; 502/350; 502/351; 502/355; 502/415; 502/439

(58) Field of Classification Search ................. 502/300, 502/302, 303, 304, 326, 327, 329, 331, 332, 502/333, 334, 339, 340, 341, 345, 346, 349, 502/350, 351, 355, 415, 439
See application file for complete search history.

(56) References Cited

U.S. PATENT DOCUMENTS 2,980,662 A * 4/1961 Jezl ............................. 526/113

(Continued)

FOREIGN PATENT DOCUMENTS

JP    H07-246343    9/1995

(Continued)

OTHER PUBLICATIONS

PH. Buffat and J-P Borel, Size effect on the melting temperature of gold particles, Physical Review A, Jun. 1976, 12 pgaes, vol. 13, No. 6.

(Continued)

*Primary Examiner*—Cam N Nguyen
(74) *Attorney, Agent, or Firm*—Global IP Counselors, LLP

(57) ABSTRACT

A catalyst which suppresses aggregation of metal particles and which has superior heat resistance. In the catalyst, metal particles are supported by a surface of a carrier while being partially embedded therein.

7 Claims, 8 Drawing Sheets

U.S. PATENT DOCUMENTS

| | | | | |
|---|---|---|---|---|
| 3,255,020 | A * | 6/1966 | Ferrell | 426/124 |
| 3,266,477 | A * | 8/1966 | Stiles | 126/19 R |
| 3,271,322 | A * | 9/1966 | Stiles | 502/159 |
| 3,357,916 | A * | 12/1967 | Smith | 208/120.05 |
| 3,388,077 | A * | 6/1968 | Hoekstra | 502/328 |
| 3,478,329 | A * | 11/1969 | De Rudnay | 365/120 |
| 3,531,329 | A * | 9/1970 | Selwitz | 429/42 |
| 4,255,290 | A * | 3/1981 | Flagg et al. | 502/327 |
| 4,369,132 | A * | 1/1983 | Kinoshita et al. | 502/261 |
| 4,374,046 | A * | 2/1983 | Antos | 502/327 |
| RE31,719 | E * | 10/1984 | Sonetaka et al. | 502/63 |
| 4,539,311 | A * | 9/1985 | Harrison et al. | 502/304 |
| 4,548,921 | A * | 10/1985 | Geus et al. | 502/330 |
| 4,716,087 | A * | 12/1987 | Ito et al. | 429/40 |
| 4,765,874 | A * | 8/1988 | Modes et al. | 205/635 |
| 4,857,499 | A * | 8/1989 | Ito et al. | 502/326 |
| 4,904,633 | A * | 2/1990 | Ohata et al. | 502/304 |
| 5,039,647 | A * | 8/1991 | Ihara et al. | 502/251 |
| 5,122,496 | A * | 6/1992 | Vorlop et al. | 502/245 |
| 5,395,406 | A * | 3/1995 | Clavenna et al. | 48/198.7 |
| 5,446,003 | A * | 8/1995 | Augustine et al. | 502/159 |
| 5,677,258 | A * | 10/1997 | Kurokawa et al. | 502/303 |
| 5,750,458 | A * | 5/1998 | Kennelly et al. | 502/304 |
| 5,849,660 | A * | 12/1998 | Takemoto et al. | 502/327 |
| 6,066,410 | A * | 5/2000 | Auer et al. | 429/40 |
| 6,066,587 | A * | 5/2000 | Kurokawa et al. | 502/66 |
| 6,083,467 | A | 7/2000 | Takeshima et al. | |
| 6,110,862 | A * | 8/2000 | Chen et al. | 502/326 |
| 6,228,800 | B1 * | 5/2001 | Yamaguchi et al. | 502/339 |
| 6,306,794 | B1 * | 10/2001 | Suzuki et al. | 502/304 |
| 6,511,642 | B1 * | 1/2003 | Hatanaka et al. | 423/239.1 |
| 6,514,905 | B1 * | 2/2003 | Hanaki et al. | 502/328 |
| 6,680,279 | B2 * | 1/2004 | Cai et al. | 502/327 |
| 6,764,665 | B2 * | 7/2004 | Deeba et al. | 423/239.1 |
| 6,806,382 | B2 * | 10/2004 | Baker et al. | 560/245 |
| 6,861,387 | B2 * | 3/2005 | Ruth et al. | 502/184 |
| 6,926,875 | B2 * | 8/2005 | Hatanaka et al. | 423/239.1 |
| 7,053,024 | B2 * | 5/2006 | Baker et al. | 502/439 |
| 2002/0032349 | A1 * | 3/2002 | Baker et al. | 564/423 |
| 2004/0171480 | A1 * | 9/2004 | Hampden-Smith et al. | 502/102 |

FOREIGN PATENT DOCUMENTS

| | | |
|---|---|---|
| JP | H10-216517 | 8/1998 |
| JP | 2000-001119 | 7/2000 |
| JP | 2000-279824 | 10/2000 |
| JP | 2003-290667 | 10/2003 |
| JP | 2004-082000 | 3/2004 |

OTHER PUBLICATIONS

M. Che, J.F.Dutel, P. Gallezot, and M. Primet, A Study of the Chemisorption of Nitric Oxide on PdY Zeolite. Evidence for a Room Temperature Oxidative Dissolution of Pd Crystallites, The Journal of Physical Chemistry, 1976, 11 pages, vol. 60, No. 21.

* cited by examiner

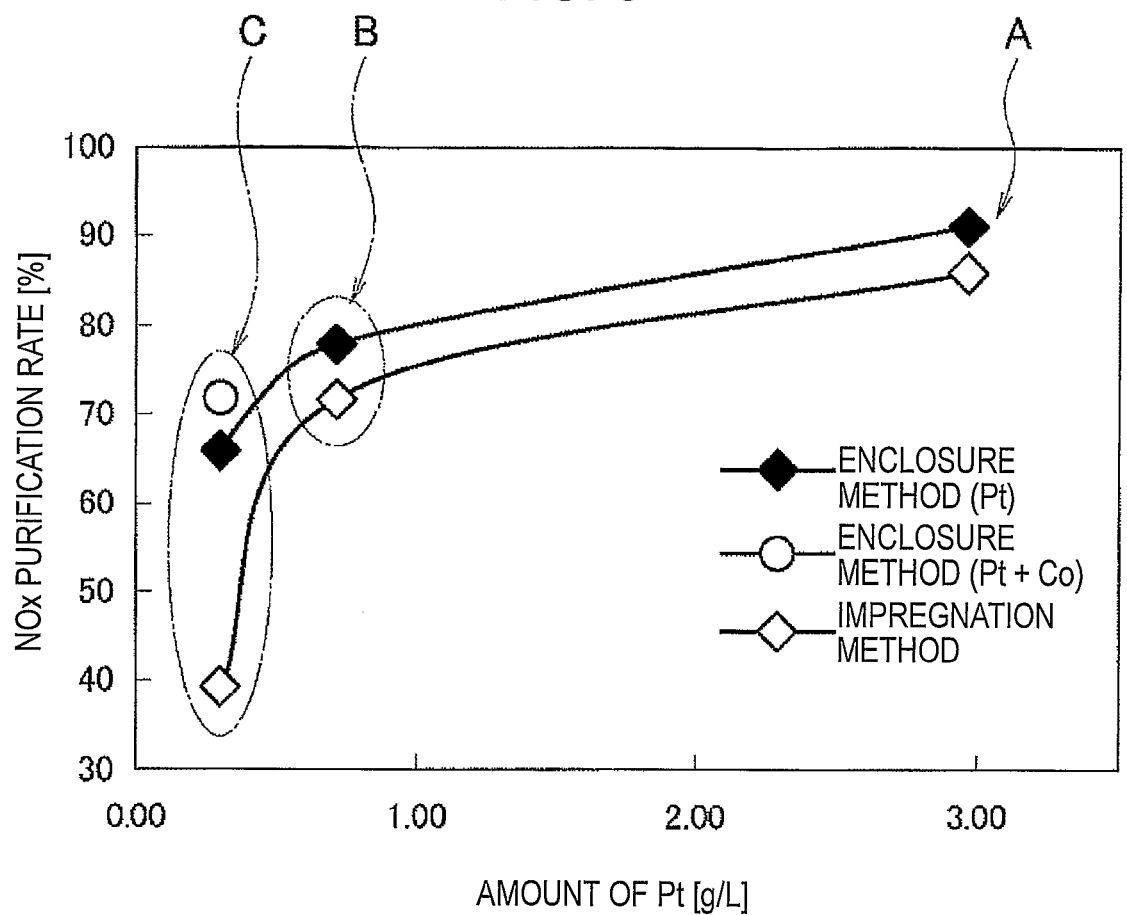

US 7,605,108 B2

CATALYST, EXHAUST GAS PURIFICATION CATALYST, AND METHOD FOR MANUFACTURING SAME

This application claims the benefit of Japanese Application No. 2004-202,125, filed Jul. 8, 2004 and Japanese Application No. 2004-377,929, filed Dec. 27, 2004, the entireties of which are incorporated herein by reference.

FIELD OF THE INVENTION

The present invention relates to catalysts, exhaust gas purification catalysts, and methods for manufacturing the catalysts, and more specifically, relates to an exhaust gas purification catalyst for purifying an exhaust gas emitted from internal combustion engines.

BACKGROUND OF THE INVENTION

Since emission control for automobiles has been increasingly performed on a global basis, three-way catalysts have been used for removing hydrocarbons (HC), carbon monoxide (CO), and nitrogen oxides ($NO_2$) contained in exhaust gases. The three-way catalysts are usually composed of fine noble metal particles such as platinum (Pt), palladium (Pd), and rhodium (Rd) supported by porous oxide carriers such as alumina ($Al_2O_3$). The noble metal functions as an active point of the catalyst.

Noble metals tend to aggregate at high temperatures, such as several hundred degrees (° C.). This aggregation causes the surface area of the active point to be decreased. Hence, in order to prevent the aggregation, control of the distance between the fine noble metal particles and control of the particle diameter thereof have been considered.

As for the control of the distance between the fine noble metal particles, since aggregation thereof is liable to progress when the fine noble metal particles are supported on an exterior carrier surface, attempts have been made to also support the fine noble metal particles on an interior of the carrier surface, that is, on surfaces of pores of the carrier. Furthermore, as for the control of the particle diameter of the fine noble metal particles, since the melting point of the particles decreases with decreasing size, at least the initial size of the fine noble metal particles is required to have a certain minimum (see Ph. Buffat et al., Phys. Rev. A, Vol. 13, No. 6 (1976)). Still further, when the particle diameters of fine noble metal particles which are supported are non-uniform, the aggregation thereof is more liable to progress by using localized metal particles having a large particle diameter as nuclei (see M. Che, J. F. Dutel et al., J. Phys. Chem. 80, p 2371. (1976)).

Hence, in order to suppress the aggregation of fine noble metal particles, it is thought to be effective to use fine noble metal particles having a diameter that meets a certain minimum, and uniformly dispersing and supporting the particles on a carrier surface.

In an attempt to accomplish the above, a catalyst has been proposed in which a metal colloid is formed using a chelating agent, and in which metal particles are dispersed and supported on a carrier surface (see Japanese Unexamined Patent Application Publication No. 2000-279824, page 2). In addition, a catalyst has also been proposed in which, by using a quaternary ammonium salt as a protective colloid, a colloid salt is supported inside pores of a carrier by impregnation (see Japanese Unexamined Patent Application Publication No. 2002-1119, page 2).

However, according to the techniques described above, a polymer material is used as a protective agent for protecting the fine noble metal particles, and the polymer material has a molecular size larger than the diameter of the pores in the alumina carrier. Consequently, the fine noble metal particles cannot be deposited inside the pores of the carrier. In addition, in the case in which a quaternary ammonium salt is used as a protective colloid, a problem of stability of the colloid salt may arise. That is, for example, the colloid may be partially aggregated and then precipitated when stored for a long period of time. Furthermore, even when noble metal colloid particles are simply supported inside pores of the carrier, migration of the noble metal itself cannot be suppressed. That is, degradation of the noble metal may disadvantageously occur due to the aggregation thereof, as discussed earlier.

SUMMARY OF THE INVENTION

The present invention was developed to solve the problems described above. According to a first aspect of the present invention, the catalyst comprises metal particles supported by a surface of a carrier, wherein the metal particles are partially embedded in the carrier.

According to a second aspect of the present invention, a method for manufacturing the catalyst comprises an enclosing step of incorporating and enclosing metal colloids in a carrier precursor so as to form a catalyst precursor, the metal colloids being metal particles protected by organic molecules provided around the peripheries thereof and being dispersed in a dispersion medium, and a firing step of firing the catalyst precursor in an oxidizing environment.

According to a third aspect of the present invention, an exhaust gas purification catalyst comprises a catalytic layer containing the catalyst according to the first aspect of the present invention.

The catalyst of the present invention exhibits superior heat resistance, because aggregation of the noble metal particles is suppressed.

In addition, the method of the present invention allows the noble metal particles to be supported on the interior surface of the carrier more effectively.

These advantages of the present invention allow for the manufacture of an exhaust gas purification catalyst that has superior heat resistance.

BRIEF DESCRIPTION OF THE DRAWINGS

For a full understanding of the nature and objects of the invention, reference should be made to the following detailed description of preferred modes of practicing the invention, read in connection with the accompanying drawings in which:

FIG. 8 is an explanatory view showing the relationship between the amount of platinum and the purification rate.

DETAILED DESCRIPTION OF THE INVENTION

Hereinafter, a catalyst, an exhaust gas purification catalyst, and a method for manufacturing a catalyst will be described in detail with reference to embodiments.

Catalyst

Figure 1A:
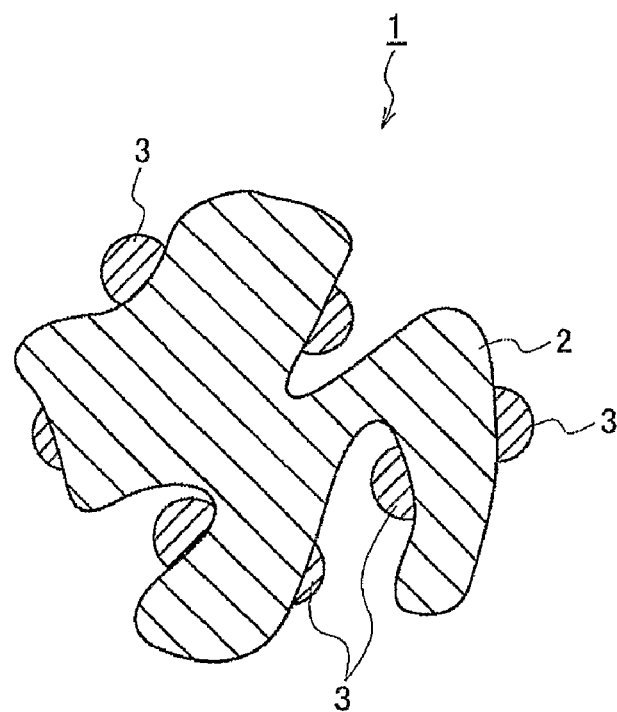
FIG. 1(A) is a view of a catalyst according to the present invention.
Figure 1B:
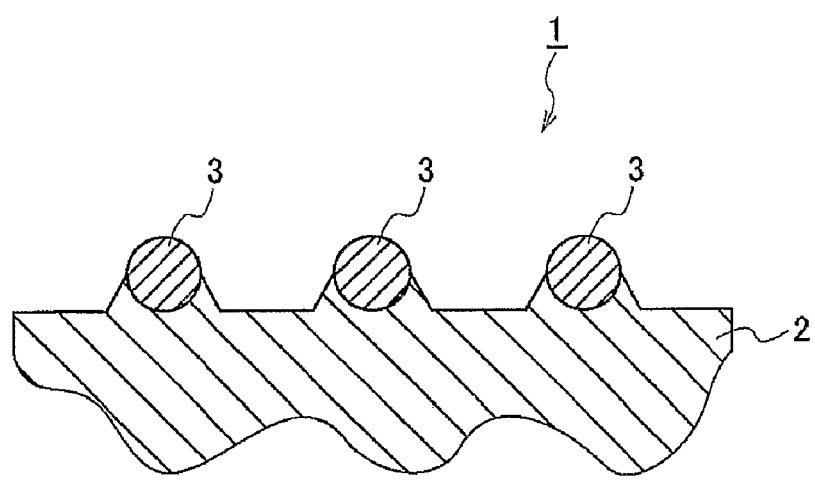
FIG. 1(B) is a partial cross-sectional view of a catalyst according to the present invention.

An embodiment of a catalyst according to the present invention will be described. In a catalyst 1 of this embodiment, as shown in FIGS. 1(A) and 1(B), metal particles 3 are supported by a surface of a carrier 2 while being partially embedded in the carrier 2. In this catalyst 1, since the metal particles 3 are supported by the surface of the carrier 2 while being partially embedded in the carrier 2, the metal particles 3 are stable on the surface of the carrier 2 and do not migrate. Hence, even at a high temperature, the aggregation of the metal particles 3 can be prevented.

In this embodiment, the surface of the carrier 2 includes the exterior surface of the carrier 2 and surfaces of pores which are formed in the carrier 2 to have a crater shape, a slit shape, or the like, that is, the surface of the carrier 2 includes both the exterior and the interior surfaces. In addition, as shown in FIG. 1(A), since the metal particles 3 are not only supported by the exterior surface of the carrier 2 but also are supported by the interior surface thereof, the surface area of the entire catalyst can be effectively used, catalytic activity per unit weight of the catalyst is increased, and the amount of an exhaust gas adsorption which is allowed to react is increased. When metal particles are supported by the exterior surface of a carrier, the distance between the metal particles is small, so that the aggregation thereof is liable to occur. However, when the metal particles are supported inside the pores of the carrier, the distance between the metal particles is increased, and as a result, the aggregation can be suppressed.

In addition, as shown in FIG. 1(B), in the catalyst 1 of this embodiment, since the metal particles 3 are supported by the surface of the carrier 2 while being partially embedded in the carrier 2, the carrier 2 surrounding the peripheries of the metal particles 3 functions as an anchor for fixing the metal particles 3. Hence, the distance between the metal particles 3 is maintained, and as a result, the aggregation of the metal particles 3 can be effectively suppressed. In general, if the metal particles have a particle diameter of 10 nm or less, the metal particles are liable to be aggregated. However, according to the catalyst of the present invention, since the metal particles 3 are partially embedded in the surface of the carrier 2, the anchor effect is particularly significant, and even after heating, the state obtained when the catalyst is manufactured can be maintained. Since the particle diameter of the metal particles is maintained, the catalytic activity can be maintained, and as a result, a catalyst having superior heat resistance can be obtained.

In the catalyst 1 of this embodiment, an exposure rate of the metal particles 3 obtained by the following Equation 1 is preferably in the range of 50% to 85%:

$$\text{Exposure Rate (\%)} = 0.895 \times \frac{A \times B \times C \times D}{E \times F} \times 100$$

wherein,

A is a CO adsorption amount ($cm^3/g$) on the metal particles,

B is a cross-sectional area of one atom of a supported noble metal ($nm^2$),

C is a density of a supported noble metal ($g/cm^3$),

D is a particle radius (nm) of the supported noble metal, which is estimated by TEM observation, E is a stoichiometric ratio of the number of adsorbed CO molecules per one atom of supported noble metal, and F is a noble metal concentration(wt %/g) in the catalyst.

For the sake of convenience, the following Table provides relevant data for Pt, Pd and Rh:

|  | Pt | Pd | Rh |
|---|---|---|---|
| atomic mass | 195.09 | 106.4000 | 102.9060 |
| density (g/cm$^3$) | 21.45 | 11.9900 | 12.4000 |
| cross-sectional area (nm$^2$) | 0.08 | 0.0787 | 0.0752 |
| stoichmetric ratio | 1 | 1 | 2 |
| Atomic radius (Å) | 1.38 | 1.376 | 1.345 |
| Cubic volume of one atom | 1.1E−29 | 1.1E−29 | 1.0E−29 |
| Surface area of one atom (m$^2$) | 2.4E−19 | 2.4E−19 | 2.3E−19 |

When the exposure rate of the metal particles 3 is in the range of 50% to 85%, this indicates that the metal particles 3 are supported by the surface of the carrier 2 while being partially embedded therein. In general, since atoms which are present on the surface of the metal particles effectively function as a catalyst, when the exposure rate is excessively low, although the stability of the metal particles is high, the metal particles cannot be sufficiently brought into contact with a reactant material, and as a result, a sufficient catalytic activity cannot be obtained. Hence, in order to maintain the performance as a catalyst, the exposure rate is preferably 50% or more. However, when the exposure rate is excessively high, although initial activity of the catalyst is high, metal particles supported by the surface of the carrier are aggregated by heating, and as a result, the durability is degraded. Hence, the exposure rate is preferably not more than 85%. Accordingly, the exposure rate of the metal particles is preferably in the range of 50% to 85%, and when the exposure rate is in the range described above, since the metal particles are dispersed over the carrier and supported thereby, the aggregation of the metal particles can be suppressed. As described above, in the catalyst 1 of this embodiment, since the exposure rate of the metal particles 3 is in the range of 50% to 85%, the anchor effect of the carrier 2 for the metal particles 3 becomes significant, and even after heating, the state obtained when the catalyst is manufactured can be maintained.

The particle diameter of the metal particles is preferably in the range of 1 to 10 nm. When the exposure rate of the metal particles is in the range of 50% to 85%, and the particle diameter thereof is in the range of 1 to 10 nm, a sufficient catalytic activity can be obtained.

The metal particles are preferably composed of at least one noble metal selected from the group consisting of Pt (platinum), Pd (palladium), and Rh (rhodium). The metals mentioned above have a high catalytic activity, and when being used as a catalyst, the above metals are effective. In addition, among those mentioned above, at least two noble metals, such as Pt and Rh, may be used by mixing with each other.

The catalyst of this embodiment preferably further comprises at least one transition metal selected from the group consisting of Mn (manganese), Fe (iron), Co (cobalt), Ni (nickel), Cu (copper), and Zn (zinc), which is in contact with both the noble metal and the carrier, and at least a part of the transition metal preferably forms a composite compound together with the carrier. In the case described above, it is believed that since the noble metal is in contact with the composite compound containing the transition metal, the catalytic performance is improved. The reason for this is believed to be a result of the so-called spillover phenomenon, in which after being adsorbed on the surface of the noble metal, an exhaust gas moves to the surface of the composite compound and is then purified on the surface thereof. That is, it is believed that since the noble metal and the composite compound containing the transition metal are in contact with each other, in addition to the function as the catalyst, the noble metal also serves as an adsorption site adsorbing an exhaust gas, and the transition metal in the composite compound is activated so as to function as a catalytic site at which a catalytic reaction occurs. As described above, in the catalyst of this embodiment, since the effect of the composite compound containing the transition metal, which enhances the catalytic activity of the noble metal, can be obtained, the catalytic activity can be improved. In addition, since at least a part of the transition metal forms the composite compound together with the carrier, the composite compound serves as the anchor described above which suppresses the migration of the noble metal. Hence, the aggregation of the noble metal is suppressed, and as a result, the degradation of the catalytic active points can be reduced.

The carrier is preferably a compound containing at least one element selected from the group consisting of Al (aluminum), Ti (titanium), Zr (zirconium), Ce (cerium), and La (lanthanum). When containing one or more of the aforementioned elements, the compound serves as the anchor for the noble metal by forming the composite compound with the transition metal described above. In addition, since the elements mentioned above have an effect of activating the noble metal used as a catalytic metal and the transition metal, and an effect of improving the heat resistance of the carrier, the catalytic activity and the heat resistance are improved.

Among those mentioned above, it is preferable that the noble metal be Pt, the transition metal be Co, and the carrier be a compound containing Al. In this case, by reaction with Al, Co is likely to form $CoAl_2O_4$ (cobalt aluminate) as the composite compound. In addition, when Pt is fixed on the cobalt aluminate surface, since the cobalt aluminate has a high heat resistance and a stable crystal structure as compared to that of alumina which is a conventional carrier, the aggregation of Pt can be prevented.

When the composite compound is non-uniform, a part of the transition metal may be dissolved in a single-element oxide such as alumina to form coarse and large particles of the transition metal. In this case, since the contact between the composite compound and the noble metal may be decreased, or the contact probability with a reactant gas may be decreased in some cases, the composite compound is preferably as uniform as possible. In addition, the composite compound may be partially or entirely composed of at least one simple oxide, a composite compound oxide, or the like, and may also partially contain an alloy. Furthermore, a part of the transition metal in the composite compound may have a valance of zero, that is, a part of the transition metal may be in the metal state. When the part of the transition metal is in the metal state, compared to the case in which the entire transition metal is an oxide, the catalytic activity may be increased, and an efficiency of exhaust gas purification may be improved in some cases.

As described above, in the catalyst of the present invention, since the metal particles are supported by the surface of the carrier while being partially embedded in the carrier, even after heating is performed, the aggregation of the metal particles can be prevented, and hence the dispersion state obtained in manufacturing the catalyst is maintained, thereby obtaining a catalyst having superior heat resistance. Furthermore, since the metal particles are formed of the noble metal, and this noble metal is in contact with the composite compound of the transition metal and the carrier, the catalytic action of the transition metal in the composite compound is obtained, and as a result, the catalytic activity can be improved.

Method for Manufacturing Catalyst

Next, an embodiment of a method for manufacturing catalyst according to the present invention will be described. The method includes an enclosing step of incorporating and enclosing metal colloids in a carrier precursor so as to form a catalyst precursor, the metal colloids being metal particles protected by organic molecules provided around the peripheries thereof and being dispersed in a dispersion medium, and a firing step of firing the catalyst precursor in an oxidizing environment.

In the method of this embodiment, the catalyst is manufactured by an enclosure method. In the enclosure method, after colloids of metal particles are formed, and a hydroxide of a carrier metal, which is a precursor of the carrier, is formed around the peripheries of the metal colloids, this catalyst precursor is fired in an oxidizing environment, so that the metal particles can be dispersed and supported inside the carrier. Furthermore, since the carrier precursor is formed around the peripheries of the metal colloids, the metal particles are partially embedded in the carrier. Hence, the metal particles can be fixed, and as a result, a catalyst having a high heat resistance can be obtained. As described above, in the method for manufacturing a catalyst, according to this embodiment, a catalyst can be obtained in which metal particles are supported by the surface of a carrier while being partially embedded therein.

In this embodiment, as the organic molecules, compounds, such as polyvinyl pyrrolidone, polyvinyl alcohol, polyethylene imide, polyacrylic acid, oxalic acid, succinic acid, and maleic acid, having a high degree of stability, and mixtures thereof are preferably used. In addition, as the dispersion media, water, alcohols such as methanol and ethanol, esters such as methyl acetate and ethyl acetate, ethers such as diethyl ether, and mixtures thereof are preferably used.

When the catalyst precursor is formed using the organic molecules and the dispersion medium mentioned above, by arranging protective layers of the organic molecules around the peripheries of the metal particles, the metal particles can be uniformly dispersed in the dispersion medium. Furthermore, the stability of a colloid solution, that is, suppression of precipitation of the metal particles, can be obtained. Hence, a catalyst precursor in the state in which the metal particles are uniformly incorporated in the carrier precursor can be formed.

Furthermore, when this catalyst precursor is fired in an oxidizing environment, water is vaporized from the hydroxide of the carrier metal, which is a precursor of the carrier, and hence many pores are formed in the carrier after the firing, thereby forming a carrier having a high specific surface area. Subsequently, since the metal particles of the catalyst precursor are uniformly incorporated in the carrier precursor, in the catalyst formed by firing, the metal particles are uniformly supported by surfaces including the interior surface of the carrier. As described above, even when the size of the metal colloids is larger than that of the pores of the carrier, the metal particles can be impregnated and supported inside the pores.

Furthermore, by using the supporting method as described above, since barriers of the carrier are formed around the metal particles, an anchor effect of the barriers can be obtained, and as a result, the aggregation of the metal particles can be suppressed. In addition, by the formation of the barriers, the metal particles are partially embedded in the carrier. Furthermore, when a part of the barrier is formed into a composite compound with the transition metal, the catalytic activity of the transition metal is generated by the noble metal, and as a result, the surface area of the catalytic active point is increased, so that superior catalytic performance can be obtained for a long period of time.

In order to obtain the effects described above, the metal colloids are preferably colloid particles of a composite metal compound which contains at least one noble metal selected from the group consisting of Pt, Pd, and Rh and at least one transition metal selected from the group consisting of Mn, Fe, Co, Ni, Cu, and Zn. In the case described above, since particles functioning as nuclei of the metal colloids are formed from a composite of the noble metal and the transition metal, a catalytic material can be prepared in which the composite compound containing the transition metal is selectively disposed around the noble metal.

The carrier precursor is preferably a compound containing at least one element selected from the group consisting of Al, Ti, Zr, Ce, and La. Each of the above elements in the form of a water soluble inorganic salt, such as a nitrate or an acetate, may be first added to an aqueous solution containing colloid particles of the composite metal compound formed of the noble metal and the transition metal, followed by addition of a basic precipitating agent such as aqueous ammonium or an aqueous tetramethyl ammonium (TMAH) solution, so as to form a hydroxide. Alternatively, an alkoxide may be added to an aqueous colloid solution so as to form a hydroxide around the colloid particles of the composite metal compound. Furthermore, when polymer chains of the organic molecules forming metal colloids each have an imino (NH) group or the like, and the colloid solution has a basic property, by adding a mixed aqueous solution containing a precipitating agent and the metal colloids to an aqueous solution containing the carrier precursor, the metal colloids can be stably supported by the carrier.

It is more preferable that the noble metal be Pt, the transition metal be Co, and the carrier precursor be a compound containing Al. In this case, since a transition metal element such as Co is contained as the carrier precursor, a phenomenon can be suppressed in which a transition metal brought into contact with a noble metal is dissolved in a carrier material.

Figure 2:
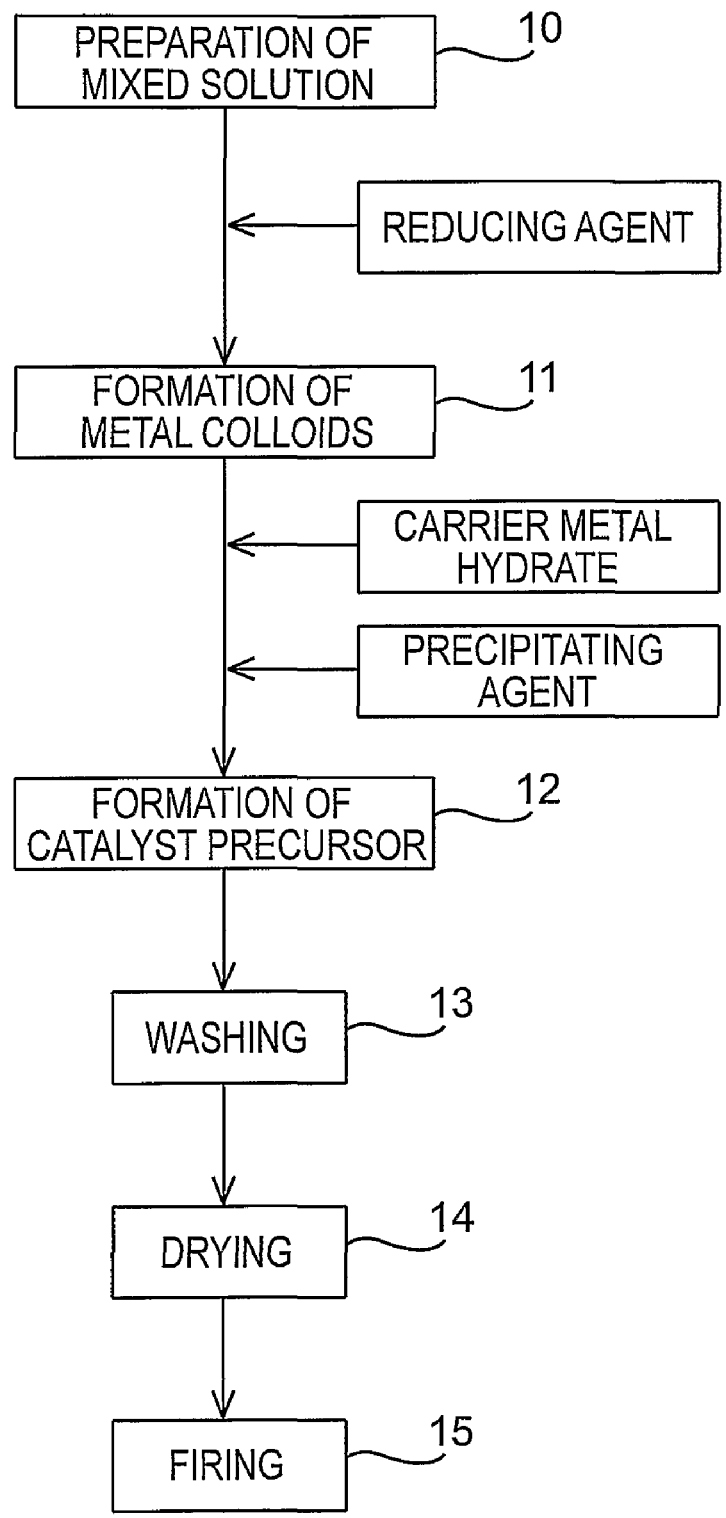
FIG. 2 is a flow chart for illustrating a method for manufacturing a catalyst according to the present invention.
Figure 3A:
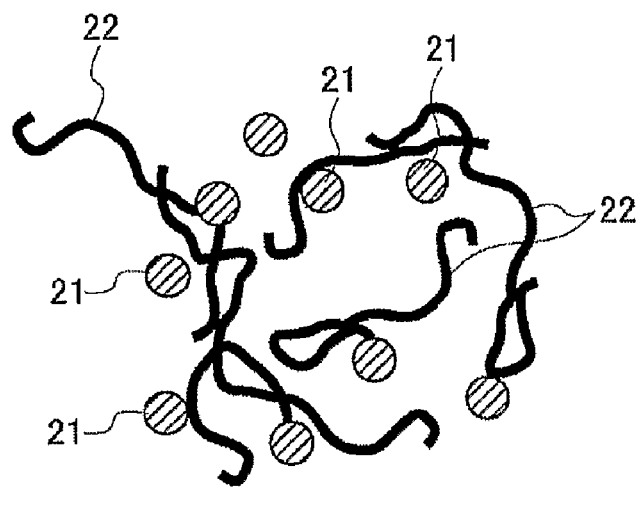
FIG. 3(A) is an explanatory view showing a mixed solution.

FIG. 2 is a flow chart illustrating the steps of a first method for manufacturing the catalyst, and FIGS. 3(A)-(D) are explanatory views illustrating the states of the materials during the process. First, organic molecules and at least one metal salt are added to a dispersion medium and are then stirred, thereby preparing a mixed solution (FIG. 2; Step 10). In this step, as the metal salt, a noble metal salt including a noble metal complex such as a dinitro diamine salt, triammine salt, tetrammine salt, or hexammine salt, or an inorganic salt such as a nitrate, chloride, or sulfate may be used, and as a transition metal salt, an acetate, nitrate, or carbonate may be used. In addition, as the organic molecules, for example, polyvinyl pyrrolidone, polyvinyl alcohol, polyethylene imide, polyacrylic acid, oxalic acid, succinic acid, and maleic acid may be used. In addition, a mixed solution containing at least two types thereof may be used. In this embodiment, as shown in FIG. 3(A), in the dispersion medium, metal ions 21 and organic molecules 22 are present.

Figure 3B:
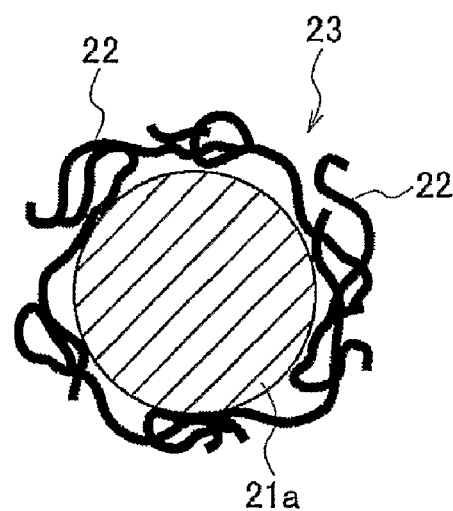
FIG. 3(B) is an explanatory view showing a metal colloid.

Next, a reducing agent is added to this solution so that the metal ions 21 are reduced, thereby forming a dispersion liquid of metal colloids 23 in each of which, as shown in FIG. 3(B), the organic molecules are coordinated around a metal particle 21a thus reduced (FIG. 2; Step 11). In this step, as the reducing agent, hydrazine, sodium boron hydride, or a hydrogen gas may be used.

Figure 3C:
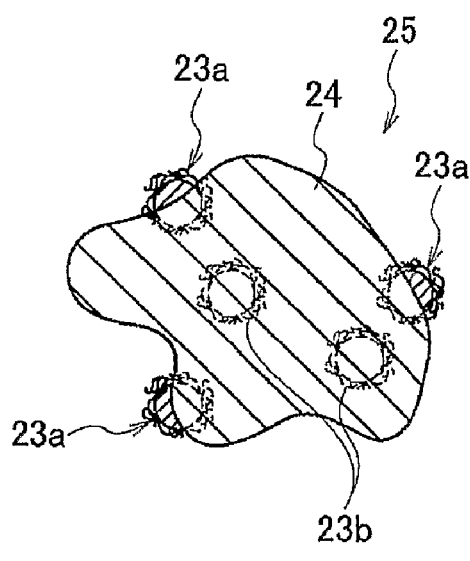
FIG. 3(C) is an explanatory view showing a catalyst precursor.
Figure 3D:
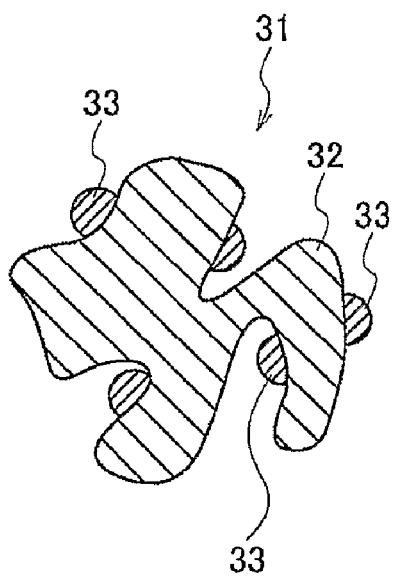
FIG. 3(D) is an explanatory view showing an obtained catalyst.

After a carrier metal hydrate which is the carrier precursor is added to this solution and is sufficiently stirred, an aqueous precipitating agent solution is dripped into this solution until a pH of 7.0 is obtained, and then the solution thus obtained is aged for one night. In this step, as shown in FIG. 3(C), the metal colloids 23 are incorporated in a hydroxide 24 which is the carrier precursor, thereby obtaining a precipitate of a catalyst precursor 25 (FIG. 2; Step 12—Enclosing Step). Some colloids 23a of the metal colloids 23 are partially incorporated in the hydroxide 24, and the other colloids 23b are entirely incorporated in the hydroxide 24. In this step, the precursor of the carrier may contain water. In addition, as the aqueous precipitating agent solution, an aqueous ammonium or an aqueous TMAH solution may be used.

Next, after filtering using a membrane filter, the precipitate thus obtained is washed with a large amount of water (FIG. 2; Step 13). Furthermore, the precipitate is dried for one day at a temperature of 120° C. (FIG. 2; Step 14). After drying, the precipitate is fired at 400° C. for 1 hour in an air stream (FIG. 2; Step 15—Firing Step), thereby obtaining a catalyst 31 shown in FIG. 3(D).

Since the catalyst 31 thus obtained is formed by firing the catalyst precursor 25 in which the metal colloids 23 are incorporated in the hydroxide 24 which is the carrier precursor, water is vaporized from the hydroxide 24, and as a result, the hydroxide 24 is contracted by dehydration. In this step, many pores are formed in a carrier 32, and the metal colloids 23 incorporated in the hydroxide 24 are changed into metal particles 33 which are partially embedded in the exterior and the interior surfaces of the carrier 32, the interior surface being inside the pores of the carrier 32. As described above, the metal particles 33 are uniformly dispersed over the carrier 32 and strongly fixed thereto. In addition, since the carrier 32 serves as the anchor for the metal particles 33, aggregation of the metal particles is suppressed, and hence the catalyst 31 can be formed so as to have a high catalytic activity and a high specific surface area which improves the catalytic performance.

In the enclosing step described above, a partial oxidizing agent may be added to the colloid solution in which the metal colloids are dispersed in the dispersion medium. The partial oxidizing agent is, for example, an aqueous solution containing an oxidizing agent such as hydrogen peroxide. This partial oxidizing agent partially oxidizes the surface of the particulate metal or that of the composite metal compound of the noble metal and the transition metal, which is once metallized by reduction using a reducing agent. By this oxidation, the particulate metal or the composite metal compound has an improved affinity to the carrier metal hydrate which is the carrier precursor, and hence the fixation of the particulate metal or the composite metal compound supported by the carrier can be facilitated. Accordingly, the exposure rate of the particulate metal or the composite metal compound can be controlled.

This effect is particularly significant in the case in which the noble metal is solely used. Since the noble metal is relatively stable as compared to the transition metal, unless partial oxidation is performed, a sufficient affinity between the carrier and the noble metal cannot be obtained. Hence, the control of the exposure rate of the noble metal becomes difficult. However, when the partial oxidizing agent is added to the colloid solution so that the surface of the noble metal is partly oxidized to a predetermined ratio, the part of the surface of the noble metal, which is oxidized, has a further improved affinity to the carrier precursor, and hence the exposure rate of the noble metal particles after firing is more controllable. As described above, by adjusting the amount of the partial oxidizing agent charged to the colloid solution, the exposure rate of the particulate metal or the composite metal compound of the catalyst can be controlled.

Figure 4:
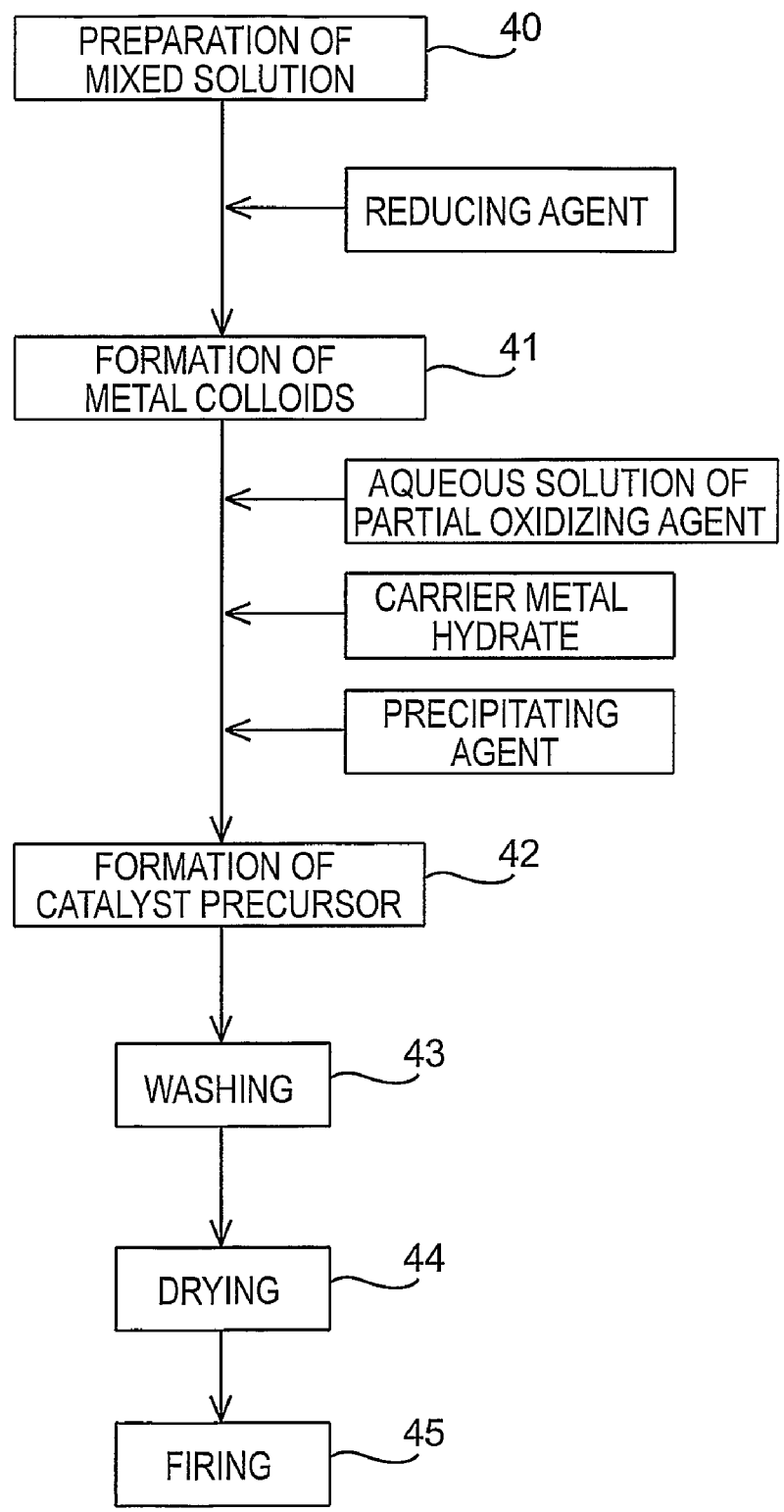
FIG. 4 is a flow chart for illustrating a different example of a method for manufacturing a catalyst according to the present invention.

FIG. 4 is a flow chart illustrating the steps of a method for manufacturing a catalyst, according to another embodiment of the present invention. A point of difference from the flow chart shown in FIG. 2 is that an aqueous solution of a partial oxidizing agent is added after Step 11. First, organic molecules and at least one metal salt are added to a dispersion medium and are then stirred, thereby preparing a mixed solution (FIG. 4; Step 40). In this step, as the metal salt, a noble metal salt including a noble metal complex such as a dinitro diamine slat, triammine salt, tetrammine salt, or hexammine salt, or an inorganic salt such as a nitrate, chloride, or sulfate may be used, and as a transition metal salt, an acetate, nitrate, or carbonate may be used. In addition, as the organic molecules, for example, polyvinyl pyrrolidone, polyvinyl alcohol, polyethylene imide, polyacrylic acid, oxalic acid, succinic acid, or maleic acid may be used. In addition, a mixed solution containing at least two types thereof may be used. In this embodiment, in the dispersion medium, metal ions and organic molecules are present.

Next, a reducing agent is added to this solution so that the metal ions are reduced, thereby forming a dispersion liquid of metal colloids in which the organic molecules are coordinated around the metal particles thus reduced (FIG. 4; Step 41). In this step, as the reducing agent, hydrazine, sodium boron hydride, or a hydrogen gas may be used.

The aqueous solution of a partial oxidizing agent is then added to this solution, so that the metal particles are partially oxidized. As the partial oxidizing agent, any compound may be used as long as it is an oxidizing agent, such as hydrogen peroxide, having the property of associating oxygen atoms with metal particles. After a carrier metal hydrate, which is a carrier precursor, is added to this solution and is sufficiently stirred, an aqueous precipitating agent solution is dripped into this solution until a pH of 7.0 is obtained, and then the solution thus obtained is aged for one night. In this step, a precipitate of a catalyst precursor is obtained in which the metal colloids are incorporated in a hydroxide which is the carrier precursor (FIG. 4; Step 42—Enclosing Step). Some colloids of the metal colloids are partially incorporated in the hydroxide, and the other colloids are entirely incorporated in the hydroxide. In this step, the precursor of the carrier may contain water. In addition, as the aqueous precipitating agent solution, an aqueous ammonium or an aqueous TMAH solution may be used.

Next, after filtering using a membrane filter, the precipitate thus obtained is washed with a large amount of water (FIG. 4; Step 43). Furthermore, the precipitate is dried for one day at a temperature of 120° C. (FIG. 4; Step 44). After drying, the precipitate is fired at 400° C. for 1 hour in an air stream (FIG. 4; Step 45—Firing Step), thereby obtaining a catalyst.

Since the catalyst thus obtained is formed by firing the catalyst precursor in which the metal colloids are incorporated in the hydroxide which is the carrier precursor, water is vaporized from the hydroxide, and as a result, the hydroxide is contracted by dehydration. In this step, many pores are formed in the carrier, and the metal colloids incorporated in the hydroxide are changed into metal particles which are partially embedded in the exterior and the interior surfaces of the carrier, the interior surface being inside the pores of the carrier. As described above, the metal particles are uniformly dispersed over the carrier and strongly fixed thereto. In addition, since the carrier serves as the anchor for the metal particles, aggregation of the metal particles is suppressed, and hence a catalyst can be formed having high catalytic activity and a high specific surface area which improves the catalytic performance.

Figure 5A:
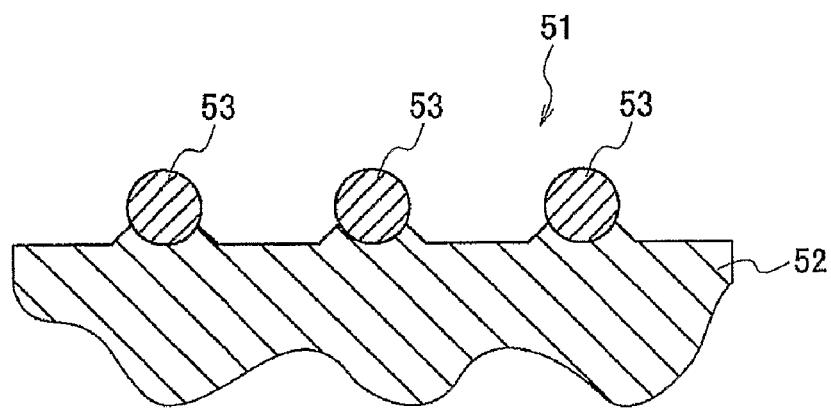
FIG. 5(A) is a partial cross-sectional view of a catalyst manufactured by using a decreased amount of a partial oxidizing agent.

In addition, by the use of the partial oxidizing agent, the exposure rate of the catalyst can be controlled. FIG. 5(A) is a partial cross-sectional view of a catalyst 51 manufactured by using a decreased amount of the partial oxidizing agent. In this catalyst 51, metal particles 53 are supported by a surface of a carrier 52 while being partially embedded therein. In this case, since the amount of the partial oxidizing agent is small, the exposure rate of the metal particle 53 is high, and the amount of the carrier 52 surrounding the periphery of the metal particle 53 is also small.

Figure 5B:
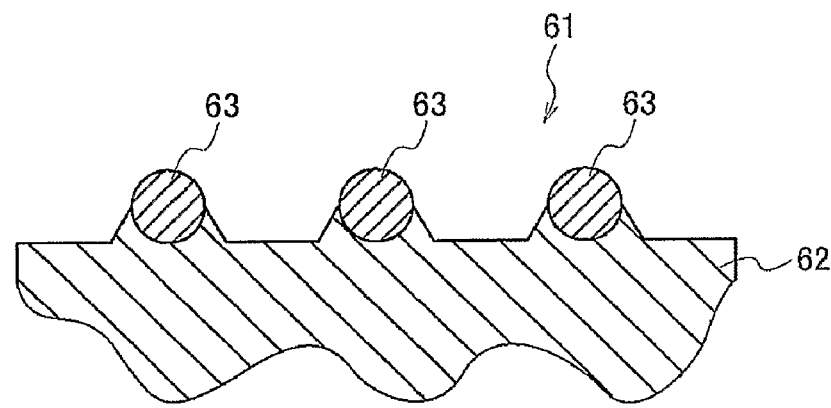
FIG. 5(B) is a partial cross-sectional view of a catalyst manufactured by using a larger amount of a partial oxidizing agent than that in the case shown in FIG. 5(A)

FIG. 5(B) is a partial cross-sectional view of a catalyst 61 manufactured by using the partial oxidizing agent in an amount larger than that in the case of the catalyst 51. In this catalyst 61, metal particles 63 are supported by a surface of a carrier 62 so that approximately 50% of each of the particles is buried in the carrier 62.

Figure 5C:
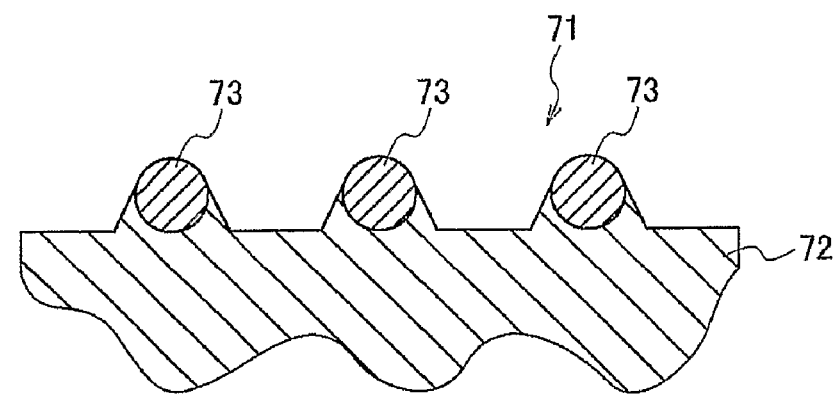
FIG. 5(C) is a partial cross-sectional view of a catalyst manufactured by using an even larger amount of a partial oxidizing agent.

FIG. 5(C) is a partial cross-sectional view of a catalyst 71 manufactured by using the partial oxidizing agent in an amount which is further increased as compared to that described above. In this catalyst 71, metal particles 73 are supported by a surface of a carrier 72 so that most of each of the particles is buried in the carrier 72. In this case, since the amount of the partial oxidizing agent is large, the exposure rate of the metal particle 73 is low, and the amount of the carrier surrounding the metal particle 73 is large.

As shown in FIGS. 5(A) to (C), by adjusting the amount of the partial oxidizing agent, the affinity of the metal particle to the carrier can be controlled, and hence the exposure rate of the metal particle supported by the carrier can be controlled.

In addition, the catalyst may be manufactured by using a reverse micelle method in which the diameter of a liquid droplet is 20 nm or less. That is, a manufacturing method may be performed in which the noble metal or a composite metal particle of the noble metal and the transition metal is precipitated in each of reverse micelles, followed by a partial oxidizing agent-addition step of adding the partial oxidizing agent in the reverse micelle and a step of enclosing the noble metal or the composite metal particle by the carrier precursor. When the catalyst is prepared by this manufacturing method, by partially oxidizing the noble metal or the composite metal particle of the noble metal and the transition metal in the reverse micelle, the affinity of the carrier precursor to the noble metal or the composite metal particle of the noble metal and the transition metal can be enhanced. In addition, as described above, by using the partial oxidizing agent, the exposure rate of the noble metal or the composite metal particle of the noble metal and the transition metal can be controlled.

Figure 6:
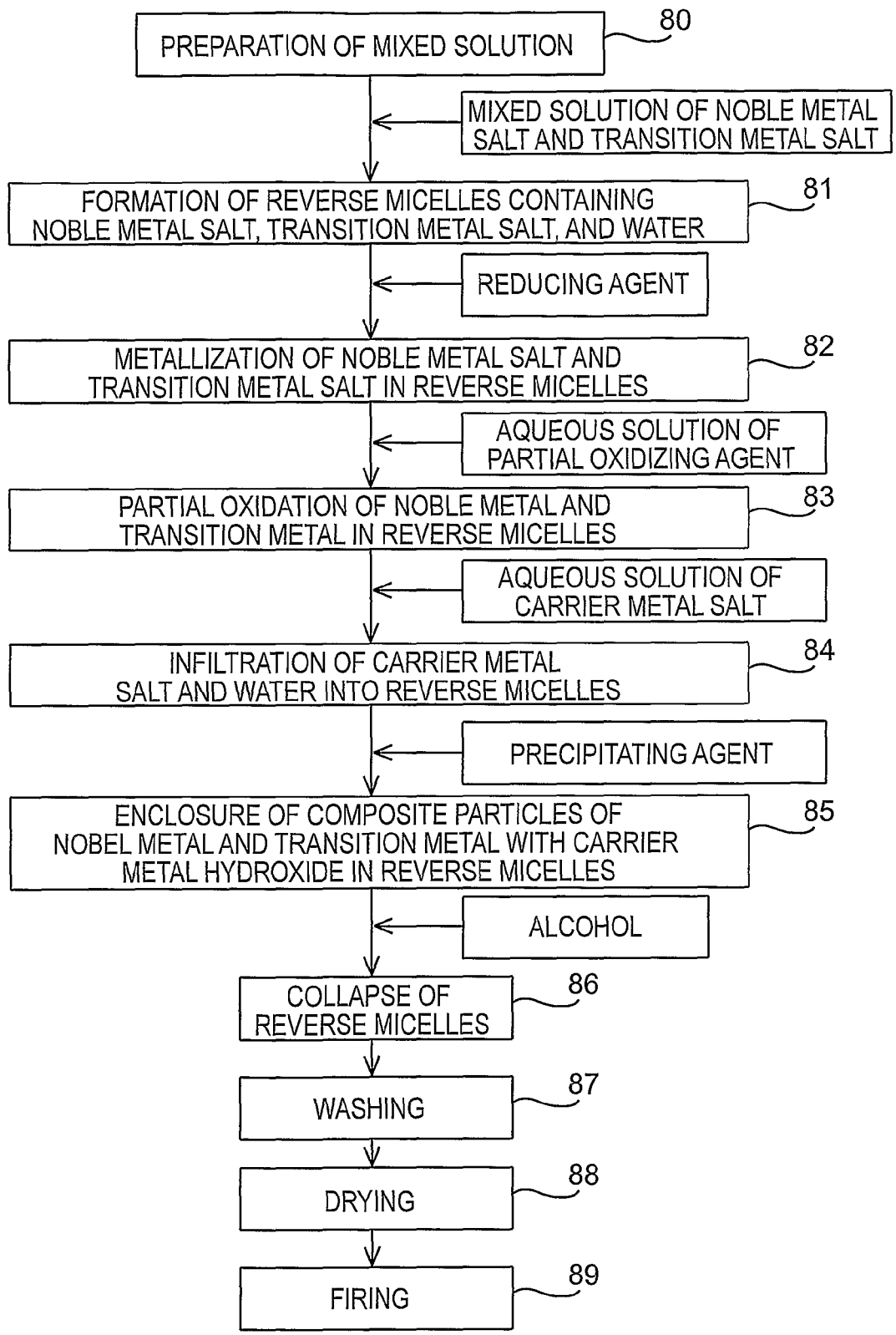
FIG. 6 is a flow chart for illustrating a different example of a method for manufacturing a catalyst according to the present invention.

FIG. 6 is a flow chart illustrating the steps of a method for manufacturing a catalyst according to yet another embodiment of the present invention. A point of difference from the flow charts shown in FIGS. 2 and 4 is that the catalyst is manufactured using the reverse micelle method. In FIG. 6, as the metal particle, a composite metal particle of the noble metal and the transition metal is used. FIGS. 7(A)-(E) are explanatory views illustrating the states of the materials during the manufacturing process.

First, a mixed solution containing an organic solvent and a surfactant dissolved therein is prepared (FIG. 6; Step 80). In this step, as the organic solvent, for example, cyclohexane, cycloheptane, octanol, isooctane, n-hexane, n-decane, benzene, toluene, or xylene may be used. In addition, a mixed solution containing at least two solvents mentioned above may also be used. As the surfactant, for example, polyethylene glycol (5) mono-4-nonylphenyl ether, or pentaethylene glycol dodecyl ether may be used.

Figure 7A:
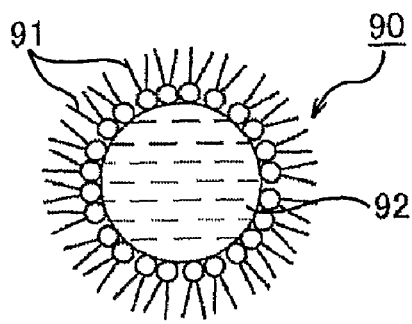
FIG. 7(A) is an explanatory view showing a reverse micelle.

When a mixed aqueous solution of a noble metal salt and a transition metal salt is added to the above mixed solution and is stirred for 2 hours, a fine reverse micelle 90 as shown in FIG. 7(A) is formed. In the reverse micelle 90, a surfactant 91 is arranged so that a hydrophilic group and a hydrophobic group thereof are located inside and outside a spherical liquid droplet, respectively, which has a diameter of approximately ten to several tens of nanometers, and in an aqueous phase inside the reverse micelle 90, an aqueous solution 92 containing the noble metal salt and the transition metal salt is contained (FIG. 6; Step 81). In this step, as the noble metal salt and the transition metal salt, for example, a nitrate, acetate, chloride, amine compound, carbonyl compound, and metal alkoxide may be used. In addition, a mixed solution containing at least two salts mentioned above may also be used.

Figure 7B:
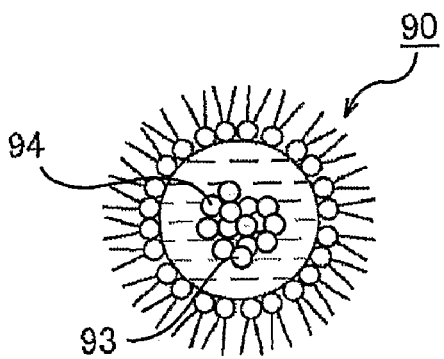
FIG. 7(B) is an explanatory view showing the state in which a noble metal and a transition metal in a reverse micelle are precipitated.
Figure 7C:
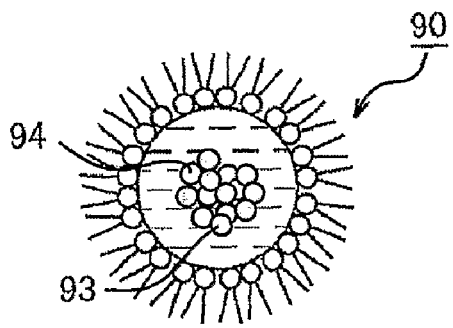
FIG. 7(C) is an explanatory view showing the state in which a carrier precursor salt and water are contained in a reverse micelle.

Next, a reducing agent for the noble metal salt and the transition metal salt is added to the mixed solution of the organic solvent containing the reverse micelles 90, and is stirred for 2 hours, so that, as shown in FIG. 7(B), the noble metal salt and the transition metal salt are simultaneously metallized in the reverse micelle 90 by reduction (FIG. 6; Step 82). As the reducing agent, for example, ammonia, tetramethyl ammonium, alkali metal hydroxide (such as sodium hydroxide), hydrazine, or sodium boron hydride may be used.

Subsequently, the aqueous solution of a partial oxidizing agent is added to the mixed solution of the organic solvent containing the reverse micelles, and the composite metal particle of the noble metal and the transition metal is partially oxidized in the reverse micelle (FIG. 6; Step 83—FIG. 7(C)). As the partial oxidizing agent, as described above, any compound may be used as long as it is an oxidizing agent, such as hydrogen peroxide, having the property of associating oxygen atoms with metal particles.

Next, an aqueous carrier metal solution is mixed together and is stirred for 2 hours, so that a salt of the carrier metal and water are impregnated into the reverse micelle 90 containing a partially oxidized composite metal particle of a noble metal 93 and a transition metal 94 (FIG. 6; Step 84). In this step, as the salt of the carrier metal, for example, a nitrate, chloride, acetate, or amine compound may be used.

Figure 7D:
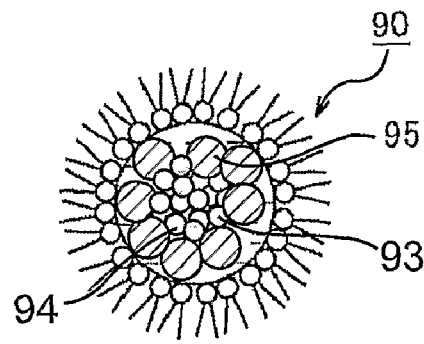
FIG. 7(D) is an explanatory view showing the state in which a carrier precursor is precipitated in a reverse micelle.

Next, an aqueous precipitating agent solution is mixed with the mixed solution of the organic solvent containing the reverse micelles, so that the salt of the carrier metal inside the reverse micelle is precipitated. In this case, as shown in FIG. 7(D), the salt of the carrier metal inside the reverse micelle 90 is metallized and is precipitated as a carrier metal 95, and the composite metal particle of the noble metal 93 and the transition metal 94 is then enclosed by the carrier metal 95 (FIG. 6; Step 85). In this step, as the precipitating agent, for example, hydrazine, sodium boron hydride, or ammonium may be used. Alternatively, a mixed solution containing at least two agents mentioned above may also be used.

Figure 7E:
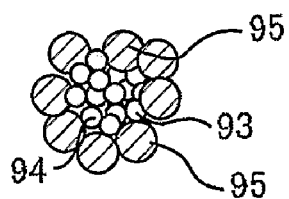
FIG. 7(E) is an explanatory view showing a precipitant obtained by collapse of a reverse micelle.
Figure 7F:
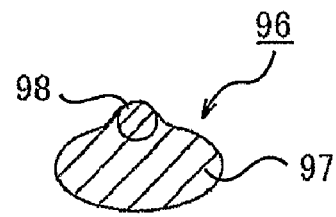
FIG. 7(F) is an explanatory view showing an obtained catalyst.

Subsequently, an alcohol is added to the mixed solution of the organic solvent containing the reverse micelles and is stirred for 2 hours so as to allow the reverse micelles to collapse (FIG. 6; Step 86). By the collapse of the reverse micelles, as shown in FIG. 7(E), a precipitate of the composite metal particle of the noble metal 93 and the transition metal 94 can be obtained, the composite metal particle being enclosed by the carrier metal 95. In this step, as the alcohol, for example, methanol or ethanol may be used.

Next, after filtering using a membrane filter, the precipitate thus obtained is washed with an alcohol and water, so that impurities (such as the surfactant) contained in the precipitate are removed (FIG. 6; Step 87). Furthermore, the precipitate is dried for one day at 120° C. (FIG. 6; Step 88). After the drying, the precipitate is fired at 400° C. for 1 hour in an air stream (FIG. 6; Step 89), thereby obtaining a catalyst 96. In this catalyst 96, a composite particle 98 of the noble metal and the transition metal is supported by the surface of the carrier so as to be partially embedded in a carrier member 97.

In this case, it is preferable that the noble metal be at least one noble metal selected from the group consisting of Pt, Pd, and Rh, the transition metal be at least one transition metal selected from the group consisting of Mn, Fe, Co, Ni, Cu, and Zn, and the carrier precursor be a compound containing at least one of Al, Ti, Zr, Ce, and La.

As described above, also in the method for manufacturing a catalyst using a reverse micelle method, since the carrier precursor is formed around the metal particles, the metal particles are partially embedded in the carrier. Hence, the metal particles can be fixed, and as a result, a catalyst having a high heat resistance can be obtained. As described above, by the method for manufacturing a catalyst according to this embodiment, a catalyst can be obtained in which the metal particles are supported by the surface of the carrier while being partially embedded therein.

In the method of manufacturing a catalyst according to this embodiment, the catalytic activity of the catalyst varies in accordance with types of elements, usage conditions, and the like. Hence, in order to obtain a desired catalytic activity, the types of elements, reducing agents, and precipitating agents, reaction temperature, reaction time, stirring intensity, and stirring method may by altered as appropriate.

EXAMPLES 1 TO 11, REFERENCE EXAMPLE 1 AND COMPARATIVE EXAMPLE 1

Hereinafter, the catalyst of the present invention will be described in more detail with reference to Examples 1 to 11, Reference Example 1, and Comparative Example 1. However, the present invention is not limited to these examples. The examples were performed for investigating the effectiveness of the catalyst of the present invention, and, in the examples, catalysts prepared from various different materials were shown by way of example.

Example 1

In Example 1, as metal particles, noble metal Pt was supported by alumina using an enclosure method. First, to a mixed solution of water and ethanol at a mixing ratio of 1:1, 55 mmol of polyvinyl pyrrolidone and 1.54 mmol of dinitro diamine platinum were added and then stirred (FIG. 2; Step 10). Next, hydrazine was added to this solution for reduction of the Pt compound, thereby obtaining a dispersion liquid of Pt fine particles having an average particle diameter of 2.1 nm (FIG. 2; Step 11). To this dispersion liquid, 735.8 g of aluminum nitrate nonahydrate was added and was sufficiently stirred, and a TMAH (tetramethyl ammonium hydroxide) solution at a concentration of 15% used as a precipitating agent was then dripped until a pH of 7.0 was obtained (FIG. 2; Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The concentration of Pt of the catalyst thus obtained was 0.3 percent by weight. In addition, the average particle diameter of Pt of the catalyst thus obtained was 3.3 nm.

Example 2

In Example 2, as metal particles, noble metal Pd was supported by zirconium oxide using an enclosure method. First, to a mixed solution of water and ethanol at a mixing ratio of 1:1, 55 mmol of polyvinyl pyrrolidone and 2.82 mmol of Pd nitrate were added and then stirred (FIG. 2; Step 10). Hydrazine was added to this solution for reduction of the Pd compound, thereby obtaining a dispersion liquid of Pd fine particles having an average particle diameter of 3.3 nm (FIG. 2; Step 11). To this dispersion liquid, 216.9 g of zirconium nitrate dihydrate was added and was sufficiently stirred, and a TMAH solution at a concentration of 15% used as a precipitating agent was then dripped until a pH of 7.0 was obtained (FIG. 2; Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The concentration of Pd of the catalyst thus obtained was 0.3 percent by weight. In addition, the average particle diameter of Pd of the catalyst thus obtained was 3.8 nm.

Example 3

In Example 3, as metal particles, noble metal Rh was supported by titanium dioxide using an enclosure method. First, to a mixed solution of water and ethanol at a mixing ratio of 1:1, 55 mmol of polyvinyl pyrrolidone and 2.92 mmol of Rh nitrate were added and then stirred (FIG. 2; Step 10). Hydrazine was added to this solution for reduction of the Rh compound, thereby obtaining a dispersion liquid of Rh fine particles having an average particle diameter of 1.0 nm (FIG. 2; Step 11). To this dispersion liquid, 2,000 g of an aqueous solution of ammonium titanium oxalate having a dried solid component of 5% was added and was sufficiently stirred, and a TMAH solution at a concentration of 15% used as a precipitating agent was then dripped until a pH of 7.0 was obtained (FIG. 2; Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The concentration of Rh of the catalyst thus obtained was 0.3 percent by weight. In addition, the average particle diameter of Rh of the catalyst thus obtained was 1.6 nm.

Example 4

In Example 4, as metal particles, noble metal Pt and transition metal Co were supported by alumina using an enclosure method. First, to a mixed solution of water and ethanol at a mixing ratio of 1:1, 55 mmol of polyvinyl pyrrolidone, 1.54 mmol of dinitro diamine Pt, and 25.5 mmol of Co nitrate were added and then stirred (FIG. 2; Step 10). Hydrazine was added to this solution for reduction of the Pt and the Co compounds, thereby obtaining a dispersion liquid of Pt—Co mixed fine particles having an average particle diameter of 3.2 nm (FIG. 2; Step 11). Next, to this dispersion liquid, 735.8 g of aluminum nitrate nonahydrate was added and was sufficiently stirred, and a TMAH solution at a concentration of 15% used as a precipitating agent was then dripped until a pH of 7.0 was obtained (FIG. 2; Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The support concentration of Pt of the catalyst thus obtained was 0.3 percent by weight, and the concentration of Co was 1.5 percent by weight. In addition, the average particle diameter of Pt of the catalyst thus obtained was 3.3 nm. In addition, Co was compounded with alumina to form Co-aluminate.

Example 5

In Example 5, as metal particles, noble metal Pd and transition metal Ni were supported by alumina using an enclosure method. First, to a mixed solution of water and ethanol at a mixing ratio of 1:1, 55 mmol of polyvinyl pyrrolidone, 2.82 mmol of Pd nitrate, and 25.5 mmol of Ni nitrate were added and then stirred (FIG. 2; Step 10). Hydrazine was added to this solution for reduction of the Pd and the Ni compounds, thereby obtaining a dispersion liquid of Pd—Ni mixed fine particles having an average particle diameter of 3.8 nm (FIG. 2; Step 11). Next, to this dispersion liquid, 735.8 g of aluminum nitrate nonahydrate was added and was sufficiently stirred, and a TMAH solution at a concentration of 15% used as a precipitating agent was then dripped until a pH of 7.0 was obtained (FIG. 2; Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The concentration of Pd of the catalyst thus obtained was 0.3 percent by weight, and the support concentration of Ni was 1.5 percent by weight. In addition, the average particle diameter of Pd of the catalyst thus obtained was 4.6 nm. In addition, Ni was compounded with alumina to form Ni-aluminate.

Example 6

In Example 6, as metal particles, noble metal Pt and transition metal Fe were supported by alumina using an enclosure method. First, to a mixed solution of water and ethanol at a mixing ratio of 1:1, 55 mmol of polyvinyl pyrrolidone, 1.54 mmol of dinitro diamine Pt, and 26.9 mmol of Fe nitrate were added and then stirred (FIG. 2; Step 10). Hydrazine was added to this solution for reduction of the Pt and the Fe compounds, thereby obtaining a dispersion liquid of Pt—Fe mixed fine particles having an average particle diameter of 3.6 nm (FIG. 2; Step 11). Next, to this dispersion liquid, 735.8 g of aluminum nitrate nonahydrate was added and was sufficiently stirred, and a TMAH solution at a concentration of 15% used as a precipitating agent was then dripped until a pH of 7.0 was obtained (Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The concentration of Pt of the catalyst thus obtained was 0.3 percent by weight, and the support concentration of Fe was 1.5 percent by weight. In addition, the average particle diameter of Pt of the catalyst thus obtained was 4.2 nm. In addition, Fe was compounded with alumina to form Fe-aluminate.

Example 7

In Example 7, as metal particles, noble metal Pt and transition metal Mn were supported by alumina using an enclosure method. First, to a mixed solution of water and ethanol at a mixing ratio of 1:1, 55 mmol of polyvinyl pyrrolidone, 1.54 mmol of dinitro diamine Pt, and 27.3 mmol of Mn nitrate were added and then stirred (FIG. 2; Step 10). Hydrazine was added to this solution for reduction of the Pt and the Mn compounds, thereby obtaining a dispersion liquid of Pt—Mn mixed fine particles having an average particle diameter of 3.0 nm (FIG. 2; Step 11). Next, to this dispersion liquid, 735.8 g of aluminum nitrate nonahydrate was added and was sufficiently stirred, and a TMAH solution at a concentration of 15% used as a precipitating agent was then dripped until a pH of 7.0 was obtained (FIG. 2; Step 12). After being aged for one night, the liquid thus obtained was repeatedly processed by filtration and washing with a large amount of water (FIG. 2; Step 13), followed by drying at 120° C. for one day (FIG. 2; Step 14). Subsequently, firing at 400° C. was performed for 1 hour, thereby forming a catalyst powder (FIG. 2; Step 15). The concentration of Pt of the catalyst thus obtained was 0.3 percent by weight, and the support concentration of Mn was 1.5 percent by weight. In addition, the average particle diameter of Pt of the catalyst thus obtained was 3.4 nm. In addition, Mn was compounded with alumina to form Mn-aluminate.

Example 8

In Example 8, except that the process was performed so as to obtain a Pt support concentration of 1 percent by weight, the catalyst powder of Example 8 was obtained in the same manner as that in Example 1. The average particle diameter of Pt of the catalyst thus obtained was 3.5 nm.

Example 9

In Example 9, except that the process was performed so as to obtain a Pt support concentration of 3 percent by weight, the catalyst powder of Example 9 was obtained in the same manner as that in Example 1. The average particle diameter of Pt of the catalyst thus obtained was 5.2 nm.

Example 10

In Example 10, as metal particles, noble metal Pt and transition metal Co were supported by alumina using an enclosure method in combination with partial oxidation. First, to a mixed solution of water and ethanol at a mixing ratio of 1:1, 55 mmol of polyvinyl pyrrolidone, 1.54 mmol of dinitro diamine Pt, and 25.5 mmol of Co nitrate were added and then stirred (FIG. 4; Step 40). Hydrazine was added to this solution for reduction of the Pt and the Co compounds, thereby obtaining a dispersion liquid of Pt—Co mixed fine particles having an average particle diameter of 3.2 nm (FIG. 4; Step 41). Next, to this dispersion liquid, an aqueous hydrogen peroxide solution at a concentration of 1% was added, which was equivalent to 1.62 mmol of $H_2O_2$, so that the Pt—Co mixed fine particles were processed by surface treatment. Subsequently, to this liquid, 735.8 g of aluminum nitrate nonahydrate was added and was sufficiently stirred, and a TMAH solution at a concentration of 15% used as a precipitating agent was then dripped until a pH of 7.0 was obtained (FIG. 4; Step 42). After being aged for one night, the liquid thus obtained was repeatedly processed by filtration and washing with a large amount of water (FIG. 4; Step 43), followed by drying at 120° C. for one day (FIG. 4; Step 44). Subsequently, firing at 400° C. was performed for 1 hour, thereby forming a catalyst powder (FIG. 4; Step 45). The concentration of Pt of the catalyst thus obtained was 0.3 percent by weight, and the support concentration of Co was 1.5 percent by weight. In addition, the average particle diameter of Pt of the catalyst thus obtained was 4.0 nm. In addition, Co was compounded with $Al_2O_3$ to form Co-aluminate.

Example 11

In Example 11, as metal particles, noble metal Pt and transition metal Co were supported by alumina using a reverse micelle method. First, 1,000 ml of cyclohexane as an organic solvent and 66 g of polyethylene glycol (5) mono-4-nonylphenyl ether as a surfactant were prepared and were then mixed together to form a mixed solution, followed by stirring (surfactant/organic solvent (mol percent/L)=0.15) (FIG. 6; Step 80). Next, to this mixed solution thus prepared, 0.037 g of an aqueous nitric acid solution of dinitro diamine Pt (a Pt concentration of 8.46 percent by weight) as a noble metal, 0.09 g of Co nitrate hexahydrate as a transition metal, and 7.95 ml of purified water were added, followed by stirring for 2 hours, so that a reverse micelle solution containing Pt ions and Co ions in reverse micelles was prepared (FIG. 6; Step 81). After the stirring, to the Pt—Co reverse micelle solution, 0.065 g of hydrazine was added as a reducing agent and was further stirred for another 2 hours, thereby obtaining a dispersion liquid of composite ultra fine particles composed of metallized Pt—Co (FIG. 6; Step 82). Next, to this dispersion liquid, an aqueous hydrogen peroxide solution was added as an aqueous partial oxidizing solution so as to perform surface treatment of the Pt—Co composite particles, thereby partially oxidizing the noble metal and the transition metal in reverse micelles. As a carrier metal precursor, a mixed solution was prepared which was composed of 2.0 g of aluminum isopropoxide and 20 ml of cyclohexane and was then dripped to the dispersion liquid, followed by stirring for approximately 2 hours. Accordingly, in the reverse micelles, the Pt—Co ultra fine particles were enclosed with an Al hydroxide (FIG. 6; Step 84). To this mixed liquid, 122.6 ml of methanol was added so that the reverse micelles were allowed to collapse (FIG. 6; Step 86), and after stirring was performed for approximately 2 hours, filtration was performed, so that the solvent was removed. A precipitate thus obtained was washed with an alcohol, so that an excess surfactant was removed (FIG. 6; Step 87). This precipitate was dried at 100° C. for 12 hours (FIG. 6; Step 88) and was then fired at 400° C. in an air stream, thereby obtaining a catalyst powder (FIG. 6; Step 89). As for the concentration of the catalyst thus obtained with respect to 1 g of $Al_2O_3$, Pt was 0.3 percent by weight, and Co was 1.5 percent by weight. In addition, the particle diameter of Pt of the powder thus obtained was 3.5 nm. In addition, Co was compounded with $Al_2O_3$ to form Co-aluminate.

Reference Example 1

In Reference Example 1, except that the process was performed so as to obtain a Pt concentration of 0.1 percent by weight, the catalyst powder of Reference Example 1 was obtained in the same manner as that in Example 1. The average particle diameter of Pt in the catalyst was 2.6 nm.

Comparative Example 1

In Comparative Example 1, a catalyst was manufactured using an impregnation method. First, dinitro diamine platinum was supported by 100 g of alumina having a specific surface area of 200 $m^2$/g and an average pore diameter of 20 nm so as to have a concentration of 0.3 percent by weight, and after drying at 120° C. for one day, firing was performed at 400° C. for 1 hour. The concentration of Pt of the catalyst thus obtained was 0.3 percent by weight. In addition, the average particle diameter of Pt of the catalyst thus obtained was 3.1 nm.

In the examples described above, the samples thus prepared were fired at 700° C. for 3 hours in an air stream, and for the examples thus processed, particle diameter measurement by a TEM (transmission electron microscope) and exposure rate measurement by CO adsorption were performed.

Particle Diameter Measurement of Metal Particles

TEM-EDX measurement was performed for the catalysts obtained by the preparation described above and the catalysts obtained after the secondary firing. For the measurement, HF-2000 manufactured by Hitachi Ltd. was used, the measurement was performed at an acceleration voltage of 200 kV, and cutting conditions were under room temperature. As for the measurement method, envelop treatment for the catalyst powder was performed using an epoxy resin, and after the epoxy resin was cured, a ultra thin slice was formed by ultramicrotomy. By the use of the slice thus obtained, the dispersion states of various crystal particles were measured by a transmission electron microscope (TEM). Among images obtained thereby, contrast (shadow) portions were focused so as to identify the types of metals, and the particle diameters thereof were measured.

Measurement of Unit CO Adsorption Amount

For obtaining the exposure rate, the unit CO adsorption amount was measured. For the measurement of the unit CO adsorption amount, by using a measurement apparatus of metal dispersion, BEL-METAL-3 manufactured by BEL Japan, Inc., the following procedure was carried out. The sample was placed in a He gas stream at a concentration of 100%, was heated to 400° C. at a rate of 10° C./min, and was then processed by oxidation treatment at 400° C. for 15 minutes in an $O_2$ gas stream at a concentration of 100%. Subsequently, purging was performed for 5 minutes using a He gas at a concentration of 100%, and reduction treatment was then performed at 400° C. for 15 minutes in a mixture of 40% of H2 and a He balance gas. Next, the temperature was decreased to 50° C. in a He gas stream at a concentration of 100%. Subsequently, the measurement was performed by feeding a mixture of 10% of CO and a He balance gas in a pulse manner.

The support concentration of the noble metal and the transition metal, the particle diameter of the noble metal (nm), the particle diameter (nm) of the noble metal after the heat resistance test, and the exposure rate, which are obtained from each sample of Examples 1 to 11, Reference Example 1, and Comparative Example 1, are shown in Table 1 below.

TABLE 1

| | NOBLE METAL | | TRANSITION METAL | | | | PARTICLE DIAMETER OF NOBLE METAL AFTER PREPARATION (nm) | PARTICLE DIAMETER OF NOBLE METAL AFTER FIRING AT 700° C. (nm) | EXPOSURE RATE (%) |
|---|---|---|---|---|---|---|---|---|---|
| | TYPE | CONCEN-TRATION (%) | TYPE | CONCEN-TRATION (%) | MANUFAC-TURING METHOD | CARRIER | | | |
| Example 1 | Pt | 0.3 | — | 0 | ENCLOSURE | $Al_2O_3$ | 3.3 | 11.9 | 72 |
| Example 2 | Pd | 0.3 | — | 0 | ENCLOSURE | $ZrO_2$ | 3.8 | 12.7 | 75 |
| Example 3 | Rh | 0.3 | — | 0 | ENCLOSURE | $TiO_2$ | 1.6 | 8.9 | 67 |
| Example 4 | Pt | 0.3 | Co | 1.5 | ENCLOSURE | $Al_2O_3$ | 3.9 | 14.1 | 68 |
| Example 5 | Pd | 0.3 | Ni | 1.5 | ENCLOSURE | $Al_2O_3$ | 4.6 | 15.4 | 62 |
| Example 6 | Pt | 0.3 | Fe | 1.5 | ENCLOSURE | $Al_2O_3$ | 4.2 | 19.6 | 51 |
| Example 7 | Pt | 0.3 | Mn | 1.5 | ENCLOSURE | $Al_2O_3$ | 3.4 | 11.4 | 60 |
| Example 8 | Pt | 1.0 | — | 0 | ENCLOSURE | $Al_2O_3$ | 3.5 | 15.6 | 77 |
| Example 9 | Pt | 3.0 | — | 0 | ENCLOSURE | $Al_2O_3$ | 5.2 | 23.9 | 83 |
| Example 10 | Pt | 0.3 | Co | 1.5 | ENCLOSURE | $Al_2O_3$ | 4.0 | 9.8 | 58 |
| Example 11 | Pt | 0.3 | Co | 1.5 | ENCLOSURE | $Al_2O_3$ | 3.5 | 13.2 | 85 |
| Reference Example 1 | Pt | 0.1 | — | 0 | ENCLOSURE | $Al_2O_3$ | 2.6 | 5.6 | 32 |
| Comparative Example 1 | Pt | 0.3 | — | 0 | IMPREG-NATION | $Al_2O_3$ | 3.1 | 22.6 | 89 |

From the results obtained by using the TEM-EDX measurement, in each of the examples, the particle diameter after the firing at 700° C. for 3 hours was approximately 4 times that obtained before the firing. On the other hand, when the catalyst obtained in Comparative Example 1 was fired, the particle diameter thereof was not less than 7 times that obtained before firing. As described above, it was found that when the exposure rate is more than 85%, particles grow due to the aggregation thereof caused by heating, and that when the exposure rate is in the range of 50% to 85%, the growth of particles is suppressed by an anchor effect. In addition, as shown in Reference Example 1, when the exposure rate was less then 50%, the particle growth was further suppressed. However, as described later, when the exposure rate is excessively low, the purification rate is decreased, and as a result, the function as the catalyst is degraded. In addition, as shown by the results of Examples 4 to 7, it was found that when the catalyst is manufactured using the colloid particles of the composite metal compound formed from the noble metal and the transition metal, the effects obtained from the transition metals, Co, Ni, Fe, and Mn are approximately equivalent to each other. In addition, in Examples 10 and 11 in which the catalyst was manufactured using the partial oxidizing agent, it was found that the particle growth is suppressed as is the case of Example 4.

As described above, according to the method for manufacturing a catalyst of the embodiments of the present invention, since the method for manufacturing a catalyst has the steps of incorporating metal colloids in a carrier precursor to form a catalyst precursor, the metal colloids being protected by organic molecules surrounding the peripheries thereof and being dispersed in a dispersion medium, and firing the catalyst precursor in an oxidizing environment, a catalyst can be obtained in which metal particles are supported by the carrier surface while being partially embedded in the carrier. Hence, even after the firing, since the aggregation of the metal particles can be suppressed, the dispersion state obtained in manufacturing the catalyst can be maintained, and as a result, a catalyst having superior heat resistance can be obtained.

Exhaust Gas Purification Catalyst

Next, an embodiment of an exhaust gas purification catalyst of the present invention will be described. The exhaust gas purification catalyst of this embodiment has a catalytic layer made from the catalyst described above, the layer being coated on wall surfaces of a honeycomb carrier or the like. In this case, the amount of the metal particles is preferably 0.72 g or less per liter of the exhaust gas purification catalyst. When the noble metal itself is 0.72 g or less per liter of the exhaust gas purification catalyst as in the past, a sufficient catalyst activity cannot be obtained. However, as described above, since the metal particles are supported by the surface of the carrier while being partially embedded in the carrier, the metal particles are made of the noble metal, and this noble metal is in contact with the transition metal and the composite compound of the carrier, because of the anchor effect and the effect of the composite compound for enhancing the catalytic activity of the noble metal, a sufficient catalytic activity can be obtained even when the amount of the noble metal is decreased.

EXAMPLES 12 TO 15, REFERENCE EXAMPLE 2, AND COMPARATIVE EXAMPLES 2 TO 4

Hereinafter, the exhaust gas purification catalyst of the present invention will be described in more detail with reference to Examples 12 to 15, Reference Example 2, and Comparative Examples 2 to 4. However, the present invention is not limited to these examples. The examples were performed for investigating effectiveness of the exhaust gas purification catalyst of the present invention, and, in the examples, catalysts prepared from various different materials were shown by way of example.

Example 12

The catalyst powder obtained in Example 1 in an amount of 50 g, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this case, "cells" indicates the number of cells per square inch (one inch is approximately 2.54 cm), and "mils" indicates the thickness of the walls defining the cells (one mil is one thousandth of an inch). In this example, the amount of the catalyst coated on the catalyst-supporting honeycomb thus obtained was 110 g per liter of the catalyst, and the amount of Pt per liter of the catalyst was 0.30 g.

Example 13

The catalyst powder obtained in Example 4 in an amount of 50 g, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 110 g per liter of the catalyst, and the amount of Pt per liter of the catalyst was 0.30 g.

Example 14

The catalyst powder obtained in Example 8 in an amount of 50 g, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 80 g per liter of the catalyst, and the amount of Pt per liter of the catalyst was 0.72 g.

Example 15

The catalyst powder obtained in Example 9 in an amount of 50 g, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 110 g per liter of the catalyst, and the amount of Pt per liter of the catalyst was 2.97 g.

Reference Example 2

The catalyst powder obtained in Reference Example 1 in an amount of 50 g, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 310 g per liter of the catalyst, and the amount of Pt per liter of the catalyst was 0.10 g.

Comparative Example 2

The catalyst powder obtained in Comparative Example 1 in an amount of 50 g, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 110 g per liter of the catalyst, and the amount of Pt per liter of the catalyst was 0.3 g.

Comparative Example 3

In Comparative Example 3, a catalyst manufactured by an impregnation method was coated on a honeycomb supporting catalyst. First, after dinitro diamine platinum was supported on 100 g of alumina having a specific surface area of 200 m$^2$/g and an average pore diameter of 20 nm to have a concentration of 1.0 percent by weight and was then dried at 120° C. for one day, firing was performed at 400° C. for 1 hour, thereby obtaining a catalyst powder. The support concentration of Pt of the catalyst thus obtained was 1.0 percent by weight. Next, 50 g of the catalyst powder thus obtained, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 85 g per liter of the catalyst, and the amount of Pt per liter of the catalyst was 0.72 g.

Comparative Example 4

In Comparative Example 4, a catalyst manufactured by an impregnation method was coated on a honeycomb supporting catalyst. First, after dinitro diamine platinum was supported on 100 g of alumina having a specific surface area of 200 m$^2$/g and an average pore diameter of 20 nm to have a concentration of 3.0 percent by weight and was then dried at 120° C. for one day, firing was performed at 400° C. for 1 hour, thereby obtaining a catalyst powder. The support concentration of Pt of the catalyst thus obtained was 1.0 percent by weight. Next, 50 g of the catalyst powder thus obtained, 5 g of boehmite, 157 g of an aqueous solution containing nitric acid at a concentration of 10% were introduced into an alumina container and pulverized by shaking with alumina balls, thereby obtaining a catalyst slurry. Next, the catalyst slurry thus obtained was applied to a cordierite honeycomb carrier (400 cells/6 mils) having a volume of 0.0595 liters, an excess slurry in the cells was removed in an air stream, drying was performed at 120° C., and firing was then performed at 400° C. in an air stream. In this example, the amount of the catalyst coated on the catalyst-supporting honeycomb thus obtained was 110 g per liter of the catalyst, and the amount of Pt per liter of the catalyst was 2.97 g.

The samples obtained by the preparation described above were evaluated by the following methods.

Catalyst Heat Resistance Test

The evaluation was performed by firing the obtained catalyst powder at 700° C. for 1 hour in an oxygen environment.

Catalyst Evaluation Test

After a part of the catalyst carrier processed by the above heat treatment was prepared so that a catalyst having a volume of 40 ml was obtained, the catalyst evaluation was performed. The flow rate of a reactant gas was set to 40 liters/minute, the reactant gas temperature was set to 350° C., and the reactant gas composition was set so that the amount of oxygen and the amount of a reducing agent shown in Table 2 were equal to each other from a stoichiometric point of view.

TABLE 2

| Reactant Gas Component | |
|---|---|
| Composition | Concentration |
| NO | 1,000 ppm |
| CO | 0.60% |
| $H_2$ | 0.20% |
| $O_2$ | 0.60% |
| $CO_2$ | 13.90% |
| $C_3H_6$ | 1,665 ppm |
| $H_2O$ | 1,665 ppm |
| $N_2$ | Balance |

Next, a $NO_x$ purification rate was obtained in accordance with the following Equation 4, and from the value obtained thereby, the catalyst activity was evaluated:

$$NO_x \text{ Purification Rate } (\%) = \frac{(\text{inlet } NO_x \text{ concentration} - \text{outlet } NO_x \text{ concentration})}{(\text{inlet } NO_x \text{ concentration})} \times 100$$

The support concentrations of the noble metal and the transition metal, and the $NO_x$ purification rates obtained from Examples 12 to 15, Reference Example 2, and Comparative Examples 2 to 4 described above are shown in Table 3 below.

TABLE 3

| | NOBLE METAL | | TRANSITION METAL Support | | | | NO$_x$ Purification Rate (%) |
|---|---|---|---|---|---|---|---|
| | Type | Amount (g/L) | Type | Concentration (%) | Manufacturing Method | Carrier | |
| Example 12 | Pt | 0.30 | — | 0 | Enclosure | Al$_2$O$_3$ | 66 |
| Example 13 | Pt | 0.30 | Co | 1.5 | Enclosure | Al$_2$O$_3$ | 72 |
| Example 14 | Pt | 0.72 | — | 0 | Enclosure | Al$_2$O$_3$ | 78 |
| Example 15 | Pt | 2.97 | — | 0 | Enclosure | Al$_2$O$_3$ | 91 |
| Reference Example 2 | Pt | 0.10 | — | 0 | Enclosure | Al$_2$O$_3$ | 51 |
| Comparative Example 2 | Pt | 0.30 | — | 0 | Impregnation | Al$_2$O$_3$ | 39 |
| Comparative Example 3 | Pt | 0.72 | — | 0 | Impregnation | Al$_2$O$_3$ | 72 |
| Comparative Example 4 | Pt | 2.97 | — | 0 | Impregnation | Al$_2$O$_3$ | 86 |

The NO$_x$ purification rates of the exhaust gas purification catalysts of Example 12, 13, 14 and 15 were 66%, 72%, 78%, and 91%, respectively, and the NO$_x$ purification rates of the exhaust gas purification catalysts of Comparative Examples 2, 3 and 4 were 39%, 72%, and 86%, respectively. In addition, the NO$_x$ purification rate of the exhaust gas purification catalyst of Reference Example 2 was 51%. FIG. 8 shows the relationship between the amount (g/L) of Pt and the purification rate (%) of the exhaust gas purification catalyst obtained by the enclosure method and that obtained by the impregnation method.

Reference mark A in FIG. 8 shows the NO$_x$ purification rates (%) of Example 15 and Comparative Example 4 at a PT amount of 2.97 g/L. When the two values at the point indicated by reference mark A shown in FIG. 8 were compared with each other, the purification rate of Example 15 in which the exhaust gas purification catalyst was formed by the enclosure method was higher. In addition, reference mark B in FIG. 8 shows the NO$_x$ conversion rates (%) of Example 14 and Comparative Example 3 at a PT amount of 0.72 g/L. When the two values at the point indicated by reference mark B shown in FIG. 8 were compared with each other, the purification rate of Example 14 in which the exhaust gas purification catalyst was formed by the enclosure method was also higher.

Reference mark C in FIG. 8 shows the NO$_x$ conversion rates (%) of Example 12, Example 13 in which Co was contained, and Comparative Example 4 at a PT amount of 0.30 g/L. At the point indicated by reference mark C shown in FIG. 8, the purification rate of Examples 12 and 13 in both of which the exhaust gas purification catalyst was formed by the enclosure method was significantly higher than that manufactured by the impregnation method. In addition, it was found that, compared to that of Example 12 in which Co was not contained, a high purification rate was obtained and the catalyst activity was improved in Example 13 in which Co was contained.

As described above, when the amount of Pt is less than 0.72 g/L, a significant effect can be obtained by manufacturing an exhaust gas purification catalyst using the enclosure method. In addition, according to the results shown in Table 3, it was found that when the manufacturing is performed by the enclosure method, a catalyst having superior heat resistance can be obtained.

According to the results thus obtained, it was found that when the exhaust gas purification catalyst is manufactured by the enclosure method in a region in which the amount of a noble metal is 0.72 g/l or less, a catalyst having superior heat resistance can be obtained. In addition, when a transition metal was further contained, although the amount of a noble metal was decreased, a sufficient catalyst activity could be obtained.

What is claimed:

1. A catalyst comprising:
   noble metal particles supported by a surface of a carrier, the noble metal particles being partially embedded in the surface of the carrier and partially exposed on an outer periphery of the surface of the carrier and having a particle diameter of about 1 nm to 10 nm.

2. The catalyst according to claim 1, wherein
   an exposure rate of the noble metal particles obtained by the following equation is 50% to 85%:

$$\text{Exposure Rate (\%)} = 0.895 \times \frac{A \times B \times C \times D}{E \times F} \times 100$$

wherein,

A is a CO adsorption amount (cm$^3$/g) on the metal particles,

B is a cross-sectional area of one atom of a supported noble metal (nm$^2$),

C is a density of a supported noble metal (g/cm$^3$),

D is a particle radius (nm) of the supported noble metal, which is estimated by TEM observation, E is a stoichiometric ratio of the number of adsorbed CO molecules per one atom of supported noble metal, and F is a noble metal concentration (wt %/g) in the catalyst.

3. The catalyst according to claim 1, wherein
   the noble metal particles comprise at least one selected from the group consisting of Pt, Pd and Rh.

4. The catalyst according to claim 3, further comprising
   at least one transition metal selected from the group consisting of Mn, Fe, Co, Ni, Cu and Zn, which is in contact with both the noble metal and the carrier, wherein at least a part of the transition metal forms a composite compound together with the carrier.

5. The catalyst according to claim 1, wherein
   the carrier comprises at least one element selected from the group consisting of Al, Ti, Zr, Ce and La.

6. An exhaust gas purification catalyst comprising a catalytic layer containing the catalyst according to claim 1.

7. The exhaust gas purification catalyst according to claim 6, wherein
   the amount of the noble metal particles is 0.72 g or less per liter of the catalytic layer.

* * * * *